Patented Feb. 3, 1925.

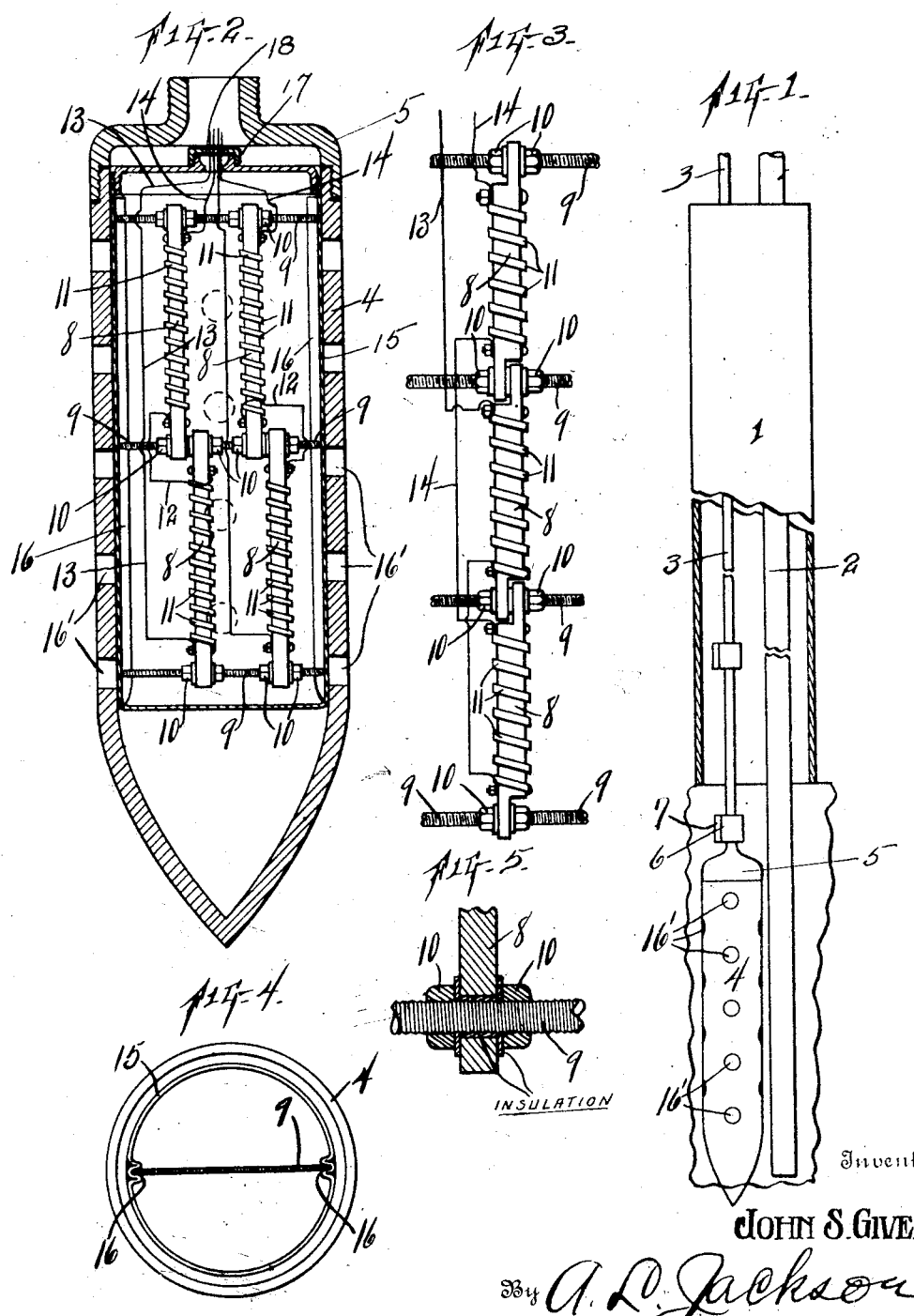

1,525,176

UNITED STATES PATENT OFFICE.

JOHN S. GIVENS, OF FORT WORTH, TEXAS.

ELECTRIC HEATING MEANS FOR OIL WELLS.

Application filed April 27, 1923. Serial No. 635,146.

*To all whom it may concern:*

Be it known that I, JOHN S. GIVENS, a citizen of the United States, residing at Fort Worth, in the county of Tarrant and State of Texas, have invented certain new and useful Improvements in Electric Heating Means for Oil Wells, of which the following is a specification.

My invention relates to electric heaters for oil wells and more particularly to heaters for melting paraffin that crystallizes or congeals or collects especially about the lower ends of the pipes and in the producing sands and for heating lower grades of oil in storage tanks and the like; and the object is to provide simple devices which will be highly efficient in melting or breaking up crystallized matter in the pipes and about the pipes so that the oil may flow or be pumped out of the wells. Other objects and advantages will be fully explained in the following description and the invention will be more particularly pointed out in the claims.

Reference is had to the accompanying drawings which form a part of this application.

Fig. 1 is a diagrammatic view, partly in section, illustrating the invention. Fig. 2 is an enlarged detail view in vertical section, showing the construction of the heating unit. Fig. 3 is an enlarged detail view, illustrating the heating elements which vary from the heating elements previously shown. Fig. 4 is a plan view of the heater casing and the inner holder and container. Fig. 5 is a detail view, illustrating the manner of insulating the heating-bars.

Similar characters of reference are used to indicate the same parts throughout the several views.

The drawings show a well casing 1 and a discharge pipe 2 and a conduit 3. The heater casing 4 is provided with a cap 5 which is screwed thereon and this cap has the upper end swaged and connected to the junction box 6 which is provided with a cap 7. The conduit 3 is connected with the junction box 6 which contains the terminal assembly. The heating units 8 are vertically arranged and are carried by supporting rods or bars 9. The members 8 are held in place by nuts 10. The heating elements 8 are insulated from the nuts 10 and from the bars 9, as shown in Fig. 5. The metallic bars 8 are wrapped with wires 11 of high resistance and which are preferably flat and pressed on the bars 8. Adjacent bars 8 are electrically connected by wires 12. A wire 13 from the junction box 6 is connected to the lower end of the lowest bar 8 and a wire 14 from the junction box 6 is connected to the upper end of the highest or first bar 8, but the connections may be varied, as shown in Fig. 3. Supply wires extend down through the conduit 3 and into the junction box for supplying electricity to the heating units in the casing 4 and within the container 15. The heating elements are carried in a container 15 and the bars 9 are held against displacement by the container 15. The container 15 is provided with vertical channels or grooves 16 on the interior wall at diametrically opposite points, as shown in Fig. 4. The bars 9 are moved longitudinally in the grooves until properly adjusted and may be secured therein in any suitable manner. The container 15 is preferably cylindrical in form and is placed within the casing 4.

The casing 4 is provided with perforations 16' arranged in staggered relation. The object of this arrangement is to provide for circulation of the heated elements or liquids and gases. The casing 4 is swaged at both ends for convenience in mounting. The heater 4 should project below the cap rock into the producing sands. The heat will be transmitted into the producing sands for melting any crystallized material and the matter crystallized on or in the pipes will also be melted.

The container 15 is sealed against the admission of liquids by a cap 17 and packing 18 through which the electric wires pass.

The heating wires may be connected in any suitable manner, as in series or in multiple. The devices herein shown are capable of various applications. They may be used for heating storage tanks to cause the water to settle quickly where the wells produce water and oil together and to heat storage tanks of oil to settle the residue and to increase the gravity of the oil and they may be used in pipe lines in cold weather to heat the oil to make it flow more freely and in oil tank cars to heat the oil in order to allow it to be pumped out of same more freely; and to heat asphalt for street paving and other purposes.

What I claim, is,—

1. Means for heating the producing sands and the lower part of a discharge pipe of an oil well comprising a conduit extending to a point near the bottom of the well, a heater housing connected to said conduit, a container for heating units mounted in said housing, a plurality of heating units mounted in said container, including bars vertically disposed and wires of high resistance wrapped thereon, means for operatively connecting said heating units with a supply source of electricity, and means for sealing said container against the admission of liquids.

2. Means for heating the producing sands and the lower part of a discharge pipe of an oil well comprising a conduit extending to a point near the bottom of the well, a heater housing connected to said conduit and perforated for circulation of liquids, a container for heating units mounted in said housing and provided with vertical channels therein a plurality of heating units fixedly mounted in said container including hanger bars projecting in said channels and vertical bars supported on said hanger bars and wires of high resistance mounted on said vertical bars, means for operatively connecting said heating units to a supply source of electricity, and means for sealing said container against the admission of liquids.

3. Means for heating the producing sands and the lower part of a discharge pipe of an oil well comprising a conduit extending to a point near the bottom of the well, a junction box connected to said conduit for the terminal assembly of electric wires, a heater housing connected to said junction box and perforated for circulation of heat and liquids, a container for heating units mounted in said housing and provided with vertical ways on the interior thereof, crossbars horizontally disposed and projecting into said ways, a plurality of heating units including vertical bars and wires of high resistance wrapped thereon mounted on said bars and insulated therefrom, and means for operatively connecting said units to the electric wires in said junction box.

4. Means for heating the producing sands and the lower part of a discharge pipe of an oil well comprising a conduit extending to a point near the producing sands, a junction box connected to said conduit for the terminals of electric supply wires, a heater housing operatively connected to said junction box, a container for heating units mounted in said housing and provided with vertical ways in the inner wall, horizontal bars mounted in said container with the ends thereof projecting into said ways, metallic bars fixedly mounted on said horizontal bars and insulated therefrom, windings on said metallic bars, and means for operatively connecting said windings and metallic bars to the electric wires in said junction box.

5. An electric heating means comprising a conduit, a junction box connected to said conduit for the terminals of electric supply wires, a heater housing operatively connected to said junction box, a container for heating units mounted in said housing, crossbars non-rotatably mounted in said container including vertically disposed bars spaced apart and wires of high resistance wrapped thereon, a plurality of heating units mounted on said bars, and means for operatively connecting said heating units to the supply wires in said junction box.

6. Means for heating the producing sands and the discharge pipe of an oil well comprising a conduit extending to a point near the bottom of the well, a wire of low resistance run through said conduit for supplying electricity, a housing for a heater element connected to said conduit and provided with a container rigid therewith, a plurality of heating units positioned within said container and spaced therefrom within said housing, each heating unit including a wire of high resistance, and said wires of high resistance being electrically connected to said supply wire in multiple.

7. Means for heating the producing sands and the discharge pipe of an oil well comprising a conduit extending to a point near the bottom of the well, a feed wire of low resistance run through said conduit for supplying electricity, means in connection with said conduit for supporting the feed wire intermediate the ends of said conduit, a housing for a heater element connected with said conduit and provided with a container rigid therewith, and a plurality of heating units positioned within said container and spaced therefrom and from said housing, each heating unit including a metallic bar and a wire of high resistance wound thereon, said wires of high resistance being electrically connected to said supply wire in multiple.

8. Means for heating the producing sands and the discharge pipe of an oil well comprising a conduit extending to a point near the bottom of the well, a feed wire of low resistance rove though said conduit, a junction box connected to said conduit and forming a part thereof, a housing for a heater element connected to said conduit and junction box, and a plurality of heating units of high resistance mounted in said housing electrically connected in multiple with said feed wire.

In testimony whereof, I set my hand, this 25th day of April, 1923.

JOHN S. GIVENS.